United States Patent
Park et al.

(10) Patent No.: US 11,258,139 B2
(45) Date of Patent: Feb. 22, 2022

(54) POUCH TYPE SECONDARY BATTERY

(71) Applicant: LG CHEM, LTD., Seoul (KR)

(72) Inventors: Jong Pil Park, Daejeon (KR); Seung Don Choi, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 207 days.

(21) Appl. No.: 16/481,333

(22) PCT Filed: Aug. 9, 2018

(86) PCT No.: PCT/KR2018/009137
§ 371 (c)(1),
(2) Date: Jul. 26, 2019

(87) PCT Pub. No.: WO2019/050177
PCT Pub. Date: Mar. 14, 2019

(65) Prior Publication Data
US 2020/0006740 A1    Jan. 2, 2020

(30) Foreign Application Priority Data

Sep. 7, 2017    (KR) .................. 10-2017-0114613

(51) Int. Cl.
*H01M 2/30* (2006.01)
*H01M 50/531* (2021.01)
(Continued)

(52) U.S. Cl.
CPC ....... *H01M 50/531* (2021.01); *H01M 10/425* (2013.01); *H01M 50/172* (2021.01); *H01M 50/46* (2021.01)

(58) Field of Classification Search
CPC .. H01M 50/531; H01M 50/46; H01M 50/172; H01M 10/425; H01M 50/578;
(Continued)

(56) References Cited

U.S. PATENT DOCUMENTS 5,703,469 A * 12/1997 Kinoshita .......... G01R 31/3828
340/636.19
10,026,949 B2    7/2018 Yang et al.
(Continued)

FOREIGN PATENT DOCUMENTS

CN    1328349 A    12/2001
CN    102055038 A    5/2011
(Continued)

OTHER PUBLICATIONS

Office Action dated Aug. 11, 2020, issued in corresponding Japanese Patent Application No. 2019-549556.
(Continued)

*Primary Examiner* — Cynthia K Walls
(74) *Attorney, Agent, or Firm* — Morgan, Lewis & Bockius LLP

(57) ABSTRACT

A pouch type secondary battery includes: an electrode assembly having an electrode including a positive electrode, a negative electrode, and a separator laminated therein; a battery case having a pouch shape to accommodate the electrode assembly; an electrode tab connected to the electrode and protruding from one side of the electrode; a first electrode lead having one end connected to the electrode tab; a second electrode lead having one end connected to the other end of the first electrode lead and the other end protruding to outside the battery case; and a connection part bonding the first electrode lead to the second electrode lead to connect the first and second electrode leads to each other. In at least one of the first and second electrode leads, a notch is on a bonding surface on which the first and second electrode leads are bonded together through the connection part.

16 Claims, 9 Drawing Sheets

(51) Int. Cl.
*H01M 10/42* (2006.01)
*H01M 50/46* (2021.01)
*H01M 50/172* (2021.01)

(58) Field of Classification Search
CPC ............ H01M 50/183; H01M 50/557; H01M 50/543; H01M 50/10; H01M 50/116; H01M 50/572; H01M 10/0525; H01M 10/48; H01M 2200/20; Y02E 60/10
See application file for complete search history.

(56) References Cited

U.S. PATENT DOCUMENTS

| | | | |
|---|---|---|---|
| 10,276,902 | B2 | 4/2019 | Park et al. |
| 2001/0038938 | A1 | 11/2001 | Takahashi et al. |
| 2011/0104520 | A1* | 5/2011 | Ahn .................. H01M 50/578 429/7 |
| 2012/0231300 | A1 | 9/2012 | Park et al. |
| 2014/0011060 | A1 | 1/2014 | Yang et al. |
| 2015/0180013 | A1* | 6/2015 | Ahn .................. H01M 50/578 429/178 |
| 2016/0028068 | A1* | 1/2016 | Yang .................. H01M 50/172 429/61 |
| 2018/0053976 | A1 | 2/2018 | Park et al. |
| 2020/0006740 | A1 | 1/2020 | Park et al. |

FOREIGN PATENT DOCUMENTS

| | | |
|---|---|---|
| CN | 104137293 A | 11/2014 |
| CN | 105027326 A | 11/2015 |
| EP | 2317589 A1 | 5/2011 |
| EP | 2950371 A1 | 12/2015 |
| EP | 3267512 A1 | 1/2018 |
| EP | 3544089 A1 | 9/2019 |
| JP | 2011-096664 A | 5/2011 |
| JP | 2016-532991 A | 10/2016 |
| KR | 10-0516774 B1 | 9/2005 |
| KR | 10-2011-0048470 A | 5/2011 |
| KR | 10-2013-0023033 A | 3/2013 |
| KR | 10-2013-0134951 A | 12/2013 |
| KR | 10-2015-0034637 A | 4/2015 |
| KR | 10-2016-0049889 A | 5/2016 |
| KR | 10-2017-0025872 A | 3/2017 |
| WO | 2016/171517 A1 | 10/2016 |

OTHER PUBLICATIONS

International Search Report dated Nov. 16, 2018, issued in corresponding International Application No. PCT/KR2018/009137.
International Search Report dated Feb. 17, 2020, issued in corresponding International Application No. PCT/KR2018/009137. Note: KR 20160049889 cited therein is already of record.
Office Action dated Jul. 5, 2021, issued in corresponding Chinese Patent Application No. 201880004795.X.

* cited by examiner

POUCH TYPE SECONDARY BATTERY

CROSS-REFERENCE TO RELATED APPLICATION

The present application claims the benefit of the priority of Korean Patent Application No. 10-2017-0114613, filed on Sep. 7, 2017, which is hereby incorporated by reference in its entirety.

TECHNICAL FIELD

The present invention relates to a pouch type secondary battery, and more particularly, to a pouch type secondary battery in which, when a user previously knows a replacement time before an electrical connection is interrupted in a situation in which a gas is generated in a case to increase in pressure.

BACKGROUND ART

Batteries (cells) that generate electric energy through physical or chemical reaction to supply the generated electric energy to the outside are used when AC power to be supplied to the building is not obtained, or DC power is required according to the living environments surrounded by various electronic devices.

Among such batteries, primary batteries and secondary batteries, which are chemical cells using chemical reaction, are generally used. The primary batteries are consumable cells which are collectively referred to as dry cells. On the other hand, a secondary battery is a rechargeable battery that is manufactured by using a material in which oxidation and reduction processes between current and a material are capable of being repeated many times. In general, secondary batteries include nickel-cadmium batteries, nickel-hydrogen batteries, lithium ion batteries, and lithium ion polymer batteries. Such a secondary battery is being applied to and used in small-sized products such as digital cameras, P-DVDs, MP3Ps, mobile phones, PDAs, portable game devices, power tools, E-bikes, and the like as well as large-sized products requiring high power such as electric vehicles and hybrid vehicles, power storage devices for storing surplus power or renewable energy, and backup power storage devices.

A lithium secondary battery is generally formed by laminating a positive electrode (i.e., cathode), a separator, and a negative electrode (i.e., anode). Also, materials of the positive electrode, the separator, and the negative electrode may be selected in consideration of battery lifespan, charging/discharging capacities, temperature characteristics, stability, and the like. The charging and discharging of the lithium secondary battery are performed while lithium ions are intercalated and deintercalated from lithium metal oxide of the positive electrode to a graphite electrode of the negative electrode.

In general, unit cells, each of which has a three-layered structure of a positive electrode/a separator/a negative electrode or a five-layered structure of a positive electrode/a separator/a negative electrode/a separator/a positive electrode or a negative electrode/a separator/a positive electrode/a separator/a negative electrode, are assembled to constitute one electrode assembly. The electrode assembly is accommodated in a specific case.

Such a secondary battery is classified into a pouch type secondary battery and a can type secondary battery according to a material of a case accommodating the electrode assembly. In the pouch type secondary battery, an electrode assembly is accommodated in a pouch made of a flexible polymer material having a variable shape. Also, in the can type secondary battery, an electrode assembly is accommodated in a case made of a metal or plastic material having a predetermined shape.

The secondary battery may be deteriorated in safety due to various problems such as internal short circuit due to an external impact, heat generation due to overcharging and overdischarging, electrolyte decomposition due to the generated heat, and a thermal runaway phenomenon. Particularly, explosion of the secondary battery is caused by various causes. For example, an increase in gas pressure within the secondary battery due to the decomposition of the electrolyte may also act as one cause.

Particularly, when the secondary battery is repeatedly charged and discharged, a gas is generated by electrochemical reaction between the electrolyte and an electrode active material. Here, the generated gas may allow the secondary battery to increase in internal pressure to cause problems such as weakening of bonding force between components, damage of a case of the secondary battery, an early operation of a protection circuit, deformation of an electrode, internal short circuit, explosion, and the like. Thus, in the case of the can type secondary battery, a protection member such as a CID filter and a safety vent is provided to physically interrupt an electrical connection when an internal pressure of a case increases. However, in the case of the pouch type secondary battery according to the related art, the protection member is not sufficiently provided.

In recent years, in the pouch type secondary battery, when the inside of a case is expanded, technologies for physically interrupting an electrical connection such as interruption of connection between an electrode tab and an electrode lead have been proposed. However, when the electrical connection is suddenly interrupted, a user that is using a product by receiving power from the secondary battery may not use the product unexpectedly. Particularly, when the product is an electric vehicle, the vehicle may be suddenly stopped while driving on the road, and thus the driver may be in a very dangerous situation.

DISCLOSURE OF THE INVENTION

Technical Problem

An object of the present invention is to provide a pouch type secondary battery in which, when a gas is generated in a case to increase in pressure, a plurality of electrode leads are attached in stages so that a user previously knows a replacement time before an electrical connection is completely interrupted.

The objects of the present invention are not limited to the aforementioned object, but other objects not described herein will be clearly understood by those skilled in the art from descriptions below.

Technical Solution

To solve the above problem, a pouch type secondary battery according to an embodiment of the present invention includes: an electrode assembly in which an electrode including a positive electrode and a negative electrode and a separator are laminated; a battery case having a pouch shape to accommodate the electrode assembly; an electrode tab connected to the electrode and protruding from one side of the electrode; a first electrode lead having one end connected to the electrode tab; a second electrode lead having one end connected to the other end of the first electrode lead and the other end protruding to the outside of the battery case; and a connection part bonding the first electrode lead to the second electrode lead to connect the first and second electrode leads to each other, wherein, in at least one of the first and second electrode leads, at least one notch is provided on a boding surface on which the first and second electrode leads are bonded to each other through the connection part.

Also, the notch may be provided in plurality, and the plurality of notches may be arranged in a line at predetermined intervals in a direction from one end to the other end of the first or second electrode lead.

Also, all the predetermined intervals between the plurality of notches may be the same.

Also, all the predetermined intervals between the plurality of notches may be different from each other.

Also, all the predetermined intervals between the plurality of notches may increase in length from one to the other end of the first or second electrode lead.

Also, the pouch type secondary battery may further include a warning notification device for notifying a warning to a user when the first and second electrode leads are detached from each other.

Also, the warning notification device may measure resistance of the first and second electrode leads to determine whether the first and second electrode leads are detached from each other and a detached stage.

Also, the notch may be provided plurality, and the warning notification device may notify different warnings to the user according to stages in which the first and second electrode leads are detached from each other.

Also, the notch may have a triangular cross-sectional shape when the first or second electrode lead is cut in a longitudinal direction thereof.

Also, the pouch type secondary battery may further include an insulation part surrounding a portion of each of the first and second electrode leads to allow the first and second electrode leads to be bonded to the battery case.

Also, bonding force between each of the first and second electrode leads and the connection part may be less than that between each of the first and second electrode leads and the insulation part.

Also, the insulation part may surround a portion at which the first and second electrode leads are connected to each other through the connection part.

Also, the insulation part may be made of at least one of thermoplastic, thermosetting and photocurable resins having electrical insulation properties.

Also, the connection part may be made of a conductive polymer including a conductive material.

Also, the connection part may have a thickness of 1 μm to 500 μm.

Particularities of other embodiments are included in the detailed description and drawings.

Advantageous Effects

The embodiments of the present invention may have at least the following effects.

The plurality of electrode leads may be bonded to each other, and the plurality of notches may be provided on the bonding surface of at least one electrode lead. Thus, when the gas is generated in the case to increase in pressure, the plurality of electrode leads may be detached in stages with respect to the positions, on which the notches are provided, to increase in resistance. Thus, the user may previously know the replacement time before the electrical connection is completely interrupted.

The effects of the prevent invention are not limited by the aforementioned description, and thus, more varied effects are involved in this specification.

MODE FOR CARRYING OUT THE INVENTION

Figure 1:
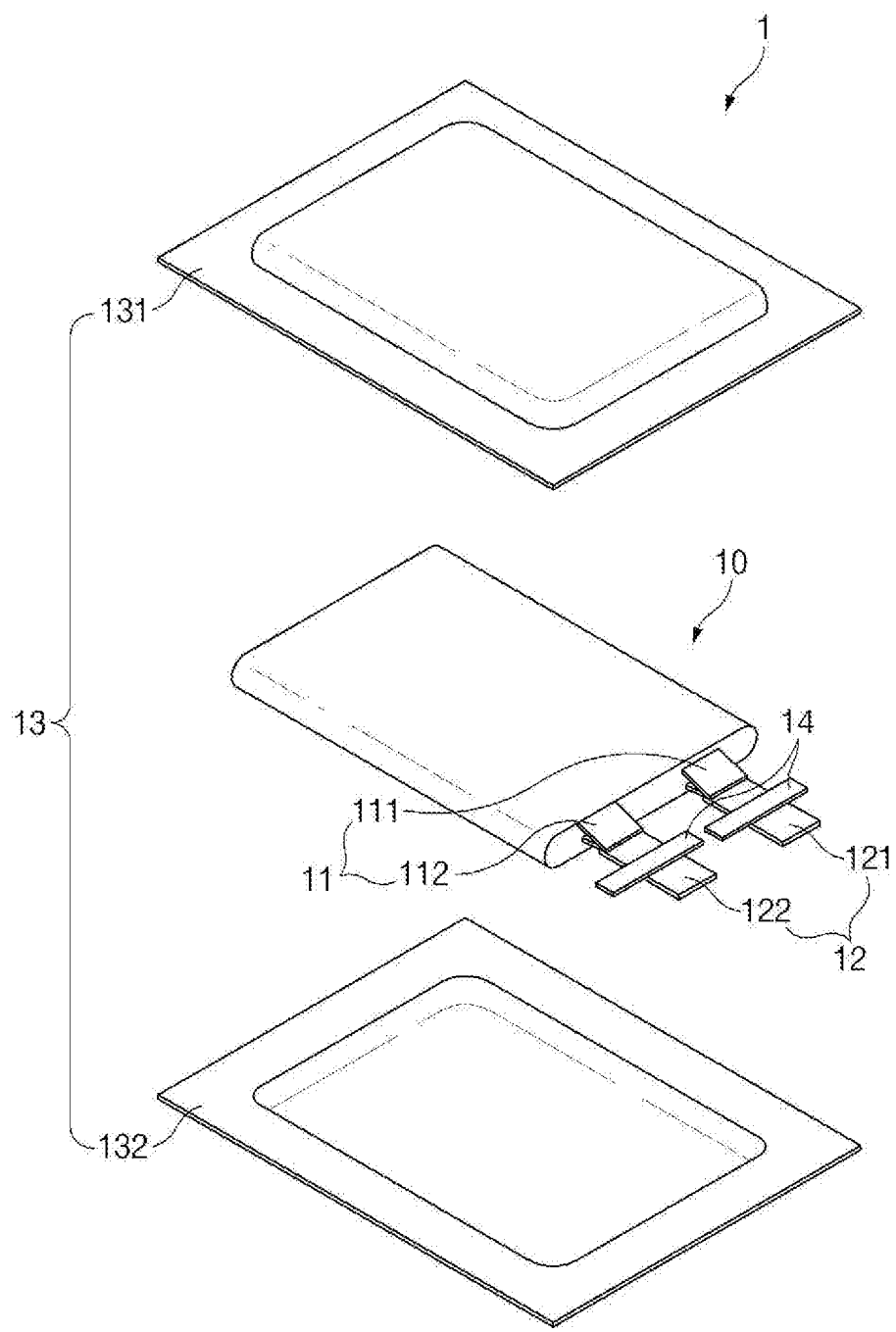
FIG. 1 is an assembled view of a pouch type secondary battery according to an embodiment of the present invention.

Advantages and features of the present disclosure, and implementation methods thereof will be clarified through following embodiments described with reference to the accompanying drawings. The present invention may, however be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Unless terms used in the present invention are defined differently, all terms (including technical and scientific terms) used herein have the same meaning as generally understood by those skilled in the art. Also, unless defined clearly and apparently in the description, the terms as defined in a commonly used dictionary are not ideally or excessively construed as having formal meaning.

In the following description, the technical terms are used only for explaining a specific exemplary embodiment while not limiting the inventive concept. In this specification, the terms of a singular form may comprise plural forms unless specifically mentioned. The meaning of 'comprises" and/or "comprising' does not exclude other components besides a mentioned component.

Hereinafter, preferred embodiments will be described in detail with reference to the accompanying drawings.

Figure 2:
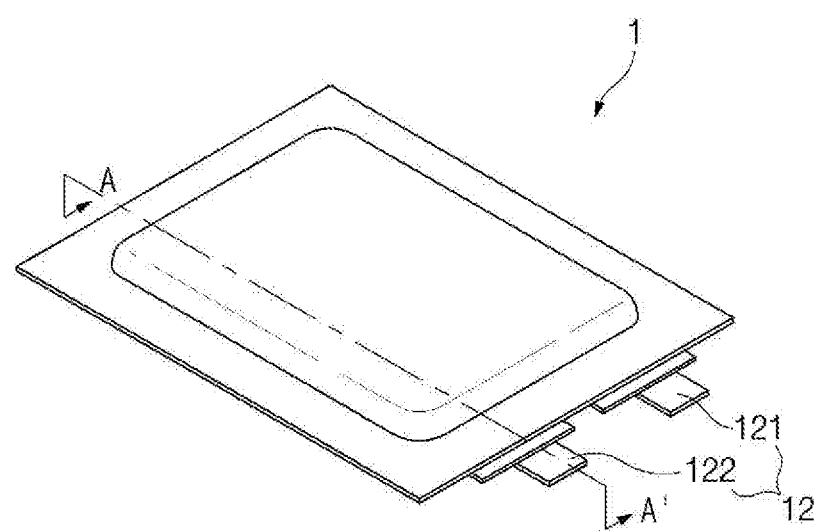
FIG. 2 is a perspective view illustrating a state in which the pouch type secondary battery is completely assembled.

FIG. 1 is an assembled view of a pouch type secondary battery 1 according to an embodiment of the present invention, and FIG. 2 is a perspective view illustrating a state in which the pouch type secondary battery 1 is completely assembled.

In general, in a process of manufacturing a lithium secondary battery, first, slurry in which an electrode active material, a binder, and a plasticizer are mixed with each other is applied to a positive electrode collector and a negative electrode collector to manufacture a positive electrode plate and a negative electrode plate. Thereafter, the negative electrode collector and the positive electrode plate are respectively laminated on both sides of a separator to form an electrode assembly 10 having a predetermined shape, and then, the electrode assembly is inserted into a battery case 13, an electrolyte is injected, and a sealing process is performed.

As illustrated in FIG. 1, the electrode assembly 10 includes an electrode tab 11. The electrode tab 11 is connected to each of a positive electrode and a negative electrode of the electrode assembly 10 to protrude to the outside of the electrode assembly 10, thereby providing a path, through which electrons moves, between the inside and outside of the electrode assembly 10. A collecting plate of the electrode assembly 10 is constituted by a portion coated with an electrode active material and a distal end, on which the electrode active material is not applied, i.e., a non-coating portion. Also, the electrode tab 111 may be formed by cutting the non-coating portion or by connecting a separate conductive member to the non-coating portion through ultrasonic welding. As illustrated in FIG. 1, the electrode tabs 11 may protrude from one side of the electrode assembly 10 in the same direction, but the present invention is not limited thereto. For example, the electrode tabs 11 may protrude in directions different from each other.

In the electrode assembly 10, the electrode lead 12 is connected to the electrode tab 11 through spot welding. The electrode lead 12 according to an embodiment of the present invention is provided in plurality. Also, in the plurality of electrode leads 12, a first electrode lead (see reference numeral 12a of FIG. 4) is connected to the electrode tab 11 of the electrode assembly 10, and a second electrode lead (see reference numeral 12b of FIG. 4) protrudes to the outside of a battery case 13. The first and second electrode leads 12a and 12b will be described below in detail. Also, a portion of the electrode lead 12 is surrounded by an insulation part 14. The insulation part 14 may be disposed to be limited within a sealing part, at which an upper pouch 131 and a lower pouch 132 are thermally fused, so as to bonded to the battery case 13. Also, electricity generated from the electrode assembly 10 may be prevented from flowing to the battery case 13 through the electrode lead 12, and the sealing of the battery case 13 may be maintained. Thus, the insulation part 14 may be made of a nonconductor having non-conductivity, which is not electrically conductive. In general, although an insulation tape which is easily attached to the electrode lead 12 and has a relatively thin thickness is mainly used as the insulation part 14, the present invention is not limited thereto. For example, various members may be used as the insulation part 14 as long as the members are capable of insulating the electrode lead 12.

The electrode lead 12 may extend in the same direction or extend in directions different from each other according to the formation positions of the positive electrode tab 111 and the negative electrode tab 112. The positive electrode lead 121 and the negative electrode lead 122 may be made of materials different from each other. That is, the positive electrode lead 121 may be made of the same material as the positive electrode plate, i.e., an aluminum (Al) material, and the negative electrode lead 122 may be made of the same material as the negative electrode plate, i.e., a copper (Cu) material or a copper material coated with nickel (Ni). Also, a portion of the electrode lead 12, which protrudes to the outside of the battery case 13, may be provided as a terminal part and electrically connected to an external terminal.

In the pouch type secondary battery 1, the battery case 13 may be a pouch made of a flexible material. Also, th battery case 13 accommodates the electrode assembly 10 so that a portion of the electrode lead 12, i.e., the terminal part is exposed and then is sealed. As illustrated in FIG. 1, the battery case 13 includes the upper pouch 131 and the lower pouch 132. A space in which the electrode assembly 10 is accommodated may be provided in the lower pouch 132, and upper pouch 131 may be disposed on the space to cover the space so that the electrode assembly 10 is not separated to the outside of the battery case 13. As illustrated in FIG. 1, the upper pouch 131 and the lower pouch 132 may be separately provided, but the present invention is not limited thereto. For example, the upper pouch 131 and the lower pouch 132 may be manufactured through various manners, that is, one side of the upper pouch 131 and one side of the lower pouch 132 may be connected to each other.

When the electrode lead 12 is connected to the electrode tab 11 of the electrode assembly 10, and the insulation part 14 is provided on a portion of the electrode lead 12, the electrode assembly 10 may be accommodated in the space provided in the lower pouch 132, and the upper pouch 131 may cover an upper portion of the space. Also, when the electrolyte is injected, and the sealing part provided on an edge of each of the upper pouch 131 and the lower pouch 132 is sealed to manufacture the secondary battery 1 as illustrated in FIG. 2.

Figure 3:
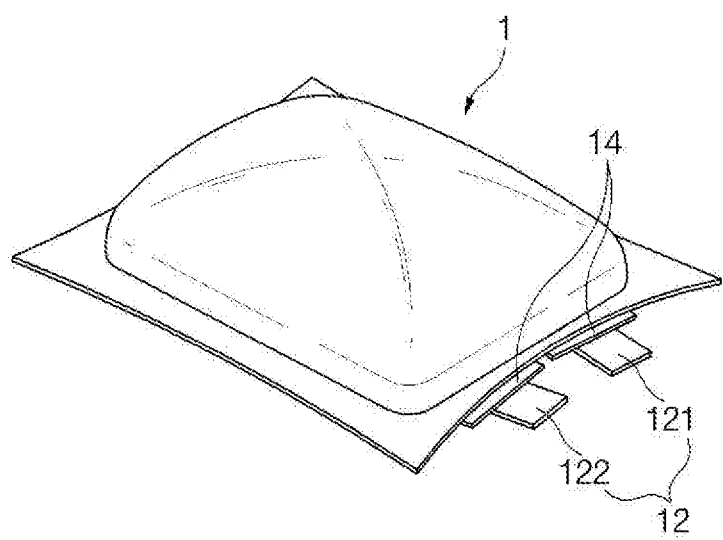
FIG. 3 is a perspective view illustrating a state in which the pouch type secondary battery is expanded in volume according to an embodiment of the present invention.

FIG. 3 is a perspective view illustrating a state in which the pouch type secondary battery 1 is expanded in volume according to an embodiment of the present invention.

The battery case 13 according to an embodiment of the present invention may be preferably a pouch made of a flexible material. Hereinafter, the case in which the battery case 13 is the pouch will be described.

In general, the battery case 13 accommodating the electrode assembly 10 includes a gas barrier layer and a sealant layer. The gas barrier layer blocks introduction and discharge of a gas, and aluminum (Al) foil is mainly used as the gas barrier layer. The sealant layer is disposed in the innermost layer and directly contacts the electrode assembly 10. Also, polypropylene (PP) or the like is mainly used for the sealant layer. Also, a surface protection layer may be further provided on an upper portion of the gas barrier layer. The surface protection layer may be disposed in the outermost layer and cause friction and collision often with the outside. Thus, a nylon resin or PET, which mainly has abrasion resistance and heat resistance, is used for the surface protection layer.

The pouch type battery case 13 may be manufactured by processing a film having the above-described lamination structure into the form of a bag. Thus, when the electrode assembly 10 is accommodated in the pouch type battery case 13, the electrolyte is injected. Thereafter, when the upper pouch 131 and the lower pouch 132 may contact each other, and thermal compression is applied to the sealing part, the sealant layers may be bonded to each other to seal the battery case 13. Here, since the sealant layer directly contacts the electrode assembly 10, the sealant layer may have to have insulating properties. Also, since the sealant contacts the electrolyte, the sealant layer may have to have corrosion resistance. Also, since the inside of the battery case 13 is completely sealed to prevent materials from moving between the inside and outside of the battery case 13, high sealability has to be realized. That is, the sealing part on which the sealant layers are bonded to each other has to have superior thermal bonding strength. In general, a polyolefin-based resin such as polypropylene (PP) or polyethylene (PE) may be used for the sealant layer. Particularly, polypropylene (PP) is excellent in mechanical properties such as tensile strength, rigidity, surface hardness, abrasion resistance, and heat resistance and chemical properties such as corrosion resistance and thus is mainly used for producing the sealant layer.

Generally, in the electrode assembly 10, the charging and discharging are performed by oxidation and reduction reactions. Here, an electrochemical reaction between the electrolyte and the electrode active material generates a gas to some degree. Furthermore, an abnormally more gas may be generated by overcharging or short-circuiting due to an abnormal reaction in the electrode assembly 10. However, since all the respective layers are made of flexible material in the pouch type battery case 13, if the internal pressure of the battery case 13 increases, the pouch type secondary battery 1 is expanded in volume as illustrated in FIG. 3. Recently, techniques for physically interrupting the electrical connection such as interruption of the connection between the electrode tab 11 and the electrode lead 12 when the secondary battery 1 is expanded in volume have been proposed. However, when the electrical connection is suddenly interrupted, a user that is using a product by receiving power from the secondary battery 1 may not use the product unexpectedly. Particularly, when the product is an electric vehicle, the vehicle may be suddenly stopped while driving on the road, and thus the driver may be in a very dangerous situation.

Figure 4:
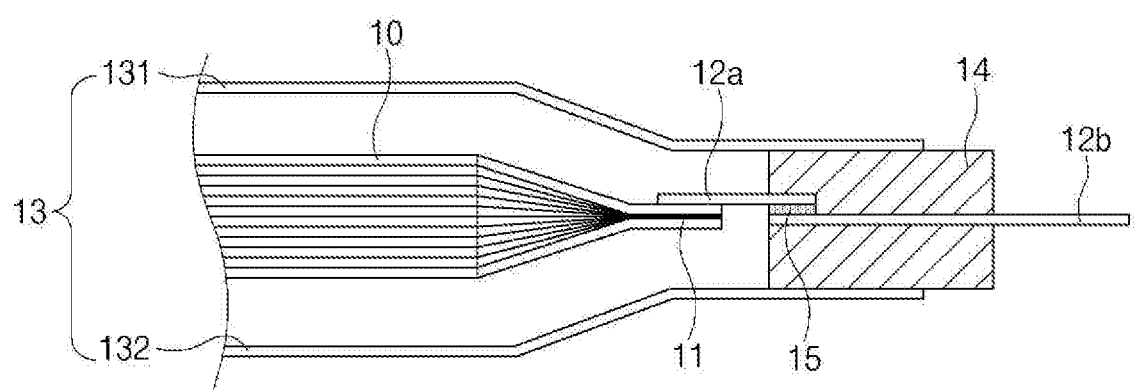
FIG. 4 is a partial cross-sectional view taken along line A-A' of FIG. 2 in the pouch type secondary battery according to an embodiment of the present invention.

FIG. 4 is a partial cross-sectional view taken along line A-A' of FIG. 2 in the pouch type secondary battery 1 according to an embodiment of the present invention.

In the pouch type secondary battery 1 according to an embodiment of the present invention, as illustrated in FIG. 4, the electrode lead 12 is provided in plurality. That is, the electrode lead 12 includes a first electrode lead 12a connected to the electrode tab 11 of the electrode assembly 10 and a second electrode lead 12b protruding to the outside of the battery case 13. Also, one surface of the first electrode lead 12a and one surface of the second electrode lead 12b are bonded to each other through a connection part 15 and thus connected to each other.

As described below, when the internal pressure of the battery case 13 increases, the first electrode lead 12a and the second electrode lead 12b are detached from each other in stages (here, the 'detachment' means that an adsorbed or attached part is separated). Also, to detach the first electrode lead 12a and the second electrode lead 12b from each other in stages, at least one notch 16 is provided on the bonding surface of at least one electrode lead 12, which is bonded through the connection part 15. When the notch 16 is provided in plurality, the plurality of notches 16 are arranged at predetermined intervals. Thus, to form the plurality of notches 16, the bonding surface may have a somewhat wide area. Thus, it is preferable that the first and second electrode leads 12a and 12b are disposed on different planes so that upper and lower surfaces thereof are connected to each other instead of that the first and second electrode leads 12a and 12b are disposed on the same plane so that side surfaces thereof are connected to each other. Thus, as illustrated in FIG. 4, a stepped portion may be provided on the portion at which the first and second electrode leads 12a and 12b are connected to each other. The notch 16 will be described below in detail.

The connection part 15 connecting the first and second electrode leads 12a and 12b to each other may have a thin film shape having conductivity. Particularly, it is preferable that the connection part 15 has a very thin thickness of 1 µm to 500 µm. Thus, even though the first and second electrode leads 12a and 12b form a stepped portion therebetween, a size of the stepped portion may not be excessively large, and the electricity generated from the electrode assembly 10 may be easily discharged to the outside. For this, the connection part 15 may be made of a polymer that is a conductive material.

The conductive material may include at least one of: natural or artificial graphite; carbon black such as carbon black, acetylene black, Ketjen black, channel black, furnace black, lamp black, and summer black; conductive fiber such as carbon fiber or metal fiber; metal powders such as carbon fluoride, aluminum, nickel, gold, silver, and copper powder; powder having a core/shell structure coated with a different kind of metal on one kind of metal; conductive whiskey such as zinc oxide and potassium titanate; conductive metal oxide such as titanium oxide; and conductive materials such as polyphenylene derivatives.

The polymer may include at least one of an acrylic resin, an epoxy resin, an ethylene propylene diene monomer (EPDM) resin, a chlorinated polyethylene (CPE) resin, silicone, polyurethane, an urea resin, a melamine resin, a phenol resin, an unsaturated ester resin, polypropylene (PP), polyethylene (PE), polyimide, and polyamide, and most preferably, an acrylic resin.

As described above, a portion of the electrode lead 12 is surrounded by the insulation part 14. In a process of sealing the upper pouch 131 and the lower pouch 132, a relatively high pressure may be applied to a portion contacting the electrode lead 12 to damage the sealant layer of the battery case 13. Since the sealant layer directly contacts the electrode assembly 10 as described above, the sealant layer may have insulating properties. However, if the sealant layer is damaged, the electricity may flows to the battery case 13 through the electrode lead 12. Particularly, since the gas barrier layer of the battery case 13 is made of a metal such as aluminum, if the sealant layer is partially damaged to expose the gas barrier layer, the electricity may easily flow due to the contact with the electrode lead 12.

Thus, the insulation part 14 may be made of a nonconductor having non-conductivity, which is not electrically conductive. Also, the insulation part 14 has high mechanical strength and heat resistance. Thus, when the upper pouch 131 and the lower pouch 132 are thermally fused, the insulation part 14 may be maintained in shape to prevent the electrode lead 12 and the gas barrier layer from contacting each other even through a portion of the sealant layer is damaged. Thus, the electricity generated from the electrode assembly 10 may be prevented from flowing to the battery case 13 through the electrode lead 12. Also, the insulation part 14 has high bonding force. Thus, the insulation part 14 may be disposed to be limited within a sealing part, at which the upper pouch 131 and the lower pouch 132 are thermally fused, so that the electrode lead 12 is bonded to the battery case 13. In general, the insulating portion 14 may be made of at least one of thermoplastic, thermosetting and photocurable resins having electrical insulation properties as a polymer resin. In general, although an insulation tape which is easily attached to the electrode lead 12 and has a relatively thin thickness is mainly used as the insulation part 14, the present invention is not limited thereto. For example, various members may be used as the insulation part 14 as long as the members are capable of insulating the electrode lead 12.

As illustrated in FIG. 4, the insulation part 14 may surround all of the first electrode lead 12a, the connection part 15, and the second electrode lead 12b. If the first electrode lead 12a or the connection part 15 is not surrounded by the insulation part 14, repulsive force may not be applied to the first electrode lead 12a and the second electrode lead 12b even though the battery case 13 is expanded. The repulsive force will be described below in detail.

Figure 5:
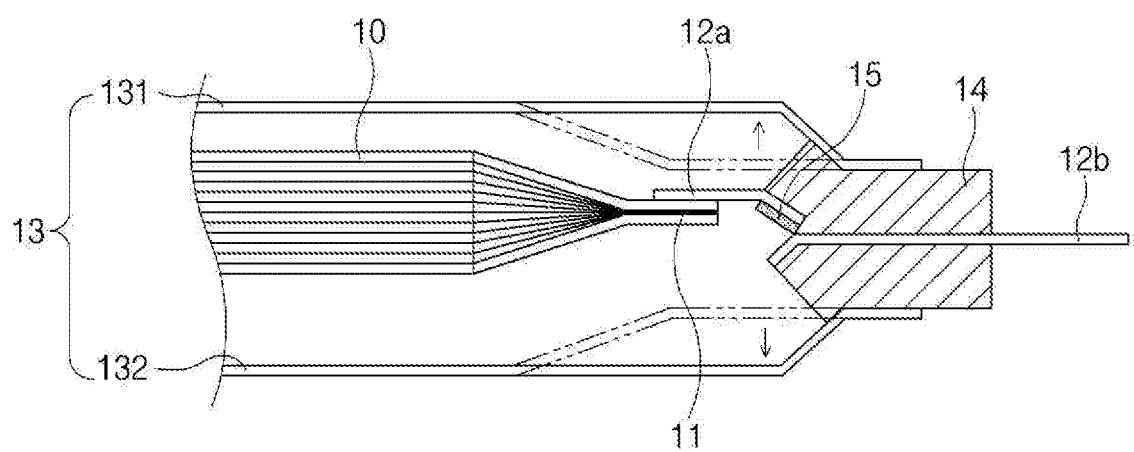
FIG. 5 is a partial cross-sectional view taken along line A-A' of FIG. 2 in the state in which the pouch type secondary battery is expanded in volume according to an embodiment of the present invention.

FIG. 5 is a partial cross-sectional view taken along line A-A' of FIG. 2 in the state in which the pouch type secondary battery is expanded in volume according to an embodiment of the present invention.

As described above, when the internal pressure of the pouch type secondary battery 13 increases, the pouch type secondary battery 1 is expanded in volume. Thus, as illustrated in FIG. 5, an outer wall of the battery case 13 moves outward. Here, upper and lower walls of the outer wall of the battery case 13 may have an area greater than that of the sidewall and be not sealed, resulting in higher flexibility. Thus, the upper wall of the battery case 13 may move upward, and the lower wall of the battery case 13 may move downward.

When the secondary battery 1 is expanded in volume, as illustrated in FIG. 5, the outer wall of the battery case 13 may move outward to apply the repulsive force to the first electrode lead 12a and the second electrode lead 12b, which are connected to each other through the insulation part 14. Thus, as the internal pressure of the battery case 13 gradually increases, the moving force of the outer wall of the battery case 13 may more increase, and the repulsive force applied to the first electrode lead 12a and the second electrode lead 12b may more increase. When the bonding force between the first electrode lead 12a and the second electrode lead 12b is greater than the repulsive force, as illustrated in FIG. 5, the first electrode lead 12a and the second electrode lead 12b may be detached from each other. Thus, the electrical connection may be interrupted so that the electricity does not flow ever. However, the bonding force between the first and second electrode leads 12a and 12b and the connection part 15 may be less than that between the first and second electrode leads 12a and 12b and the insulation part 14. Thus, when the repulsive force is applied to the first electrode lead 12a and the second electrode lead 12b, the bonding force between the first and second electrode leads 12a and 12b and the insulation part 14 may be maintained to maintain the sealing of the battery case, but the first and second electrode leads 12a and 12b may be detached from each other.

Figure 6:
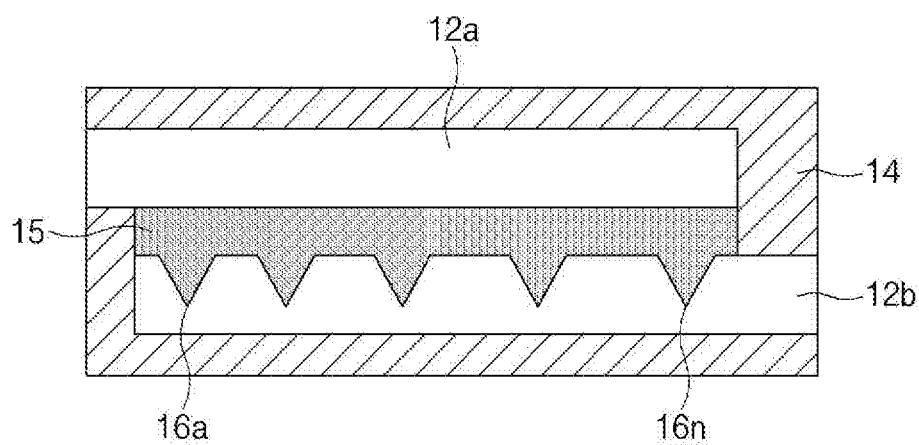
FIG. 6 is an enlarged view of a first electrode lead, a second electrode lead, and a connection part in the state of FIG. 4 according to an embodiment of the present invention.
Figure 7:
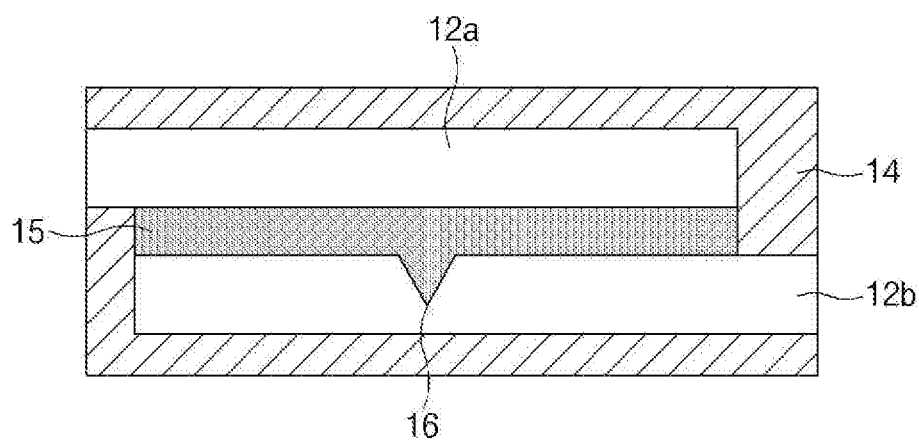
FIG. 7 is an enlarged view of a first electrode lead, a second electrode lead, and a connection part in the state of FIG. 4 according to another embodiment of the present invention.

FIG. 6 is an enlarged view of a first electrode lead 12a, a second electrode lead 12b, and a connection part 15 in the state of FIG. 4 according to an embodiment of the present invention, and FIG. 7 is an enlarged view of a first electrode lead 12a, a second electrode lead 12b, and a connection part 15 in the state of FIG. 5 according to another embodiment of the present invention.

At least one or more notches 16 are arranged in a line at a predetermined interval on one surface of the second electrode lead 12b. Here, the notch 16 may be preferably disposed on the bonding surface of one surface of the second electrode lead 12b, which is connected to the first electrode lead 12a.

As illustrated in FIG. 6, although the notch 16 is provided on only the second electrode lead, the present invention is not limited thereto. For example, the notch 16 may be provided on the first electrode lead 12a and also may be provided on all the first and second electrode leads 12a and 12b. Here, the notch 16 may be disposed on a surface on which the first and second electrode leads 12a and 12b are connected to each other. Hereinafter, the structure in which the notch 16 is provided on only the second electrode lead 12b will be described. However, this structure is for convenience of explanation and is not intended to limit the scope of the right scope of the present invention.

Since the notch 16 is provided on the second electrode lead 12b, when the second electrode lead 12b is detached from the first electrode lead 12a, the second electrode lead 12b may be detached up to a portion on which the notch 16 is provided. This is done because the portion, on which the notch 16 is provided, and the portion, on which the notch 16 is not provided, on the bonding surface connected to the first electrode lead 12a are different in bonding force from each other. Also, when the notch 16 is provided in plurality, the second electrode lead 12b is detached in stages up to the portion on which each of the notches 16 is provided. Thus, when the notch 16 is provided in plurality, it is preferable that the plurality of notches 16 are arranged in a line in a longitudinal direction from one end to the other end of the second electrode lead 12b.

When the notch 16 is provided in plurality, the plurality of notches 16 are arranged at predetermined intervals. Here, the intervals may be the same or different from each other. Particularly, as illustrated in FIG. 6, the predetermined intervals between the notches 16 may increase from one end to the other end of the second electrode lead 12b. In this case, as the stages, in which the second electrode lead 12b is detached, proceed, the internal pressure required for detaching the second electrode lead 12b may further increase. However, if the predetermined intervals between the notches 16 are the same, even though the stages in which the second electrode lead 12b is detached proceed, the increment of the internal pressure required for detaching the second electrode lead 12b may be always constant.

The notch 16 may be recessed from one surface of the second electrode lead 12b. Here, in the recessed shape, as illustrated in FIG. 6, when the electrode lead 12 is cut in the longitudinal direction, it is preferable that the cut surface is triangular shape. This is done because the second electrode lead 12b is easily bent in the vicinity of a vertex of the notch 16 so that the second electrode lead 12b is more easily detached. However, the notch 16 may not be limited in cut shape as long as the second electrode lead 12b is easily detached. For example, the cut surface of the notch 16 may have various shapes a polygonal shape such as a rectangular shape or a pentagonal shape and a semicircular shape.

As illustrated in FIG. 6, although five notches 16 may be provided, the present invention is not limited thereto. For example, various numbers of notches 16 may be provided. Furthermore, according to another embodiment of the present invention, only one notch 16 may be provided as illustrated in FIG. 7. In this case, when the second electrode lead 12b is detached up to the portion on which the one notch 16 is disposed, a warning notification device may immediately notify a warning that replacement of the secondary battery 1 is necessary to the user.

The warning notification device is a device that measures resistance of the first and second electrode leads 12a and 12b to notify the warning to the user according to a change of the resistance. As the first and second electrode leads 12a and 12b are detached from each other, i.e., as the bonding surface between the first and second electrode leads 12a and 12b decreases in area, the resistance increases. This is done because the intensity of the resistance is inversely proportional to a cross-sectional area of a conductor. However, magnitude of a voltage is constant, the warning notification device determines that the resistance increases when magnitude of current flowing through the first and second electrode leads 12a and 12b decreases. Also, the warning notification device notifies the warning that the first and second electrode leads 12a and 12b have been detached from each other. The warning notification device may be a battery management system. In this case, the warning notification device may measure resistance of the battery itself to determine whether the first and second electrode leads 12a and 12b are detached from each other.

Figure 8:
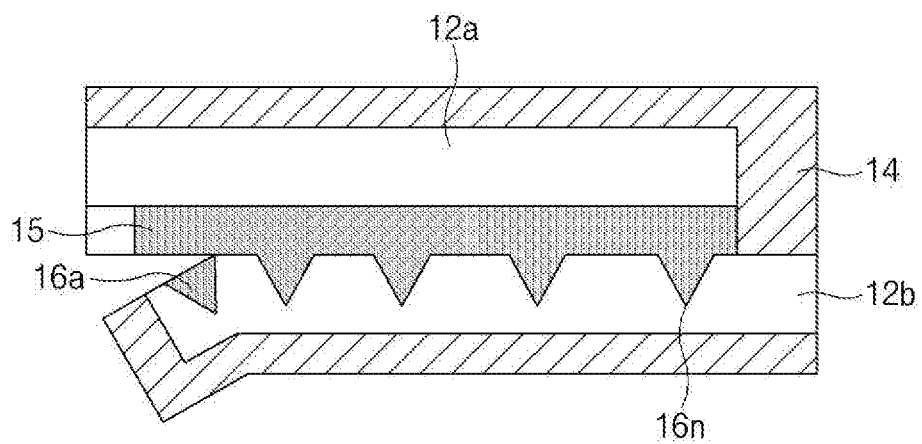
FIG. 8 is an enlarged view illustrating a state in which the second electrode lead is detached up to a portion on which a first notch is provided in FIG. 6 according to an embodiment of the present invention.

FIG. 8 is an enlarged view illustrating a state in which the second electrode lead 12b is detached up to the portion on which the first notch 16a is provided in FIG. 6 according to an embodiment of the present invention.

When a gas is generated in the battery case 13 so that the internal pressure increases to a first pressure or more, the second electrode lead 12b is detached in one stage up to the portion on which the first notch 16a is disposed. Thus, the resistance of the electrode lead 12 increases by a small amount, and the warning notification device measures the increasing resistance to notify a first warning to the user.

Here, the first pressure may vary according to conditions such as a size and a shape of the first notch 16a, bonding force between the connection part 15 and the second electrode lead 12b, and a distance from one end of the second electrode lead 12b to the first notch 16a. Thus, a relationship between the conditions and the first pressure is experimentally derived in advance. Also, the pressure desired by the user is defined as the first pressure, and the conditions are set to conditions corresponding to the defined first pressure. Thus, when the internal pressure of the battery case 13 increases to be equal to or greater than the first pressure defined by the user, the second electrode lead 12b is detached in one stage.

Figure 9:
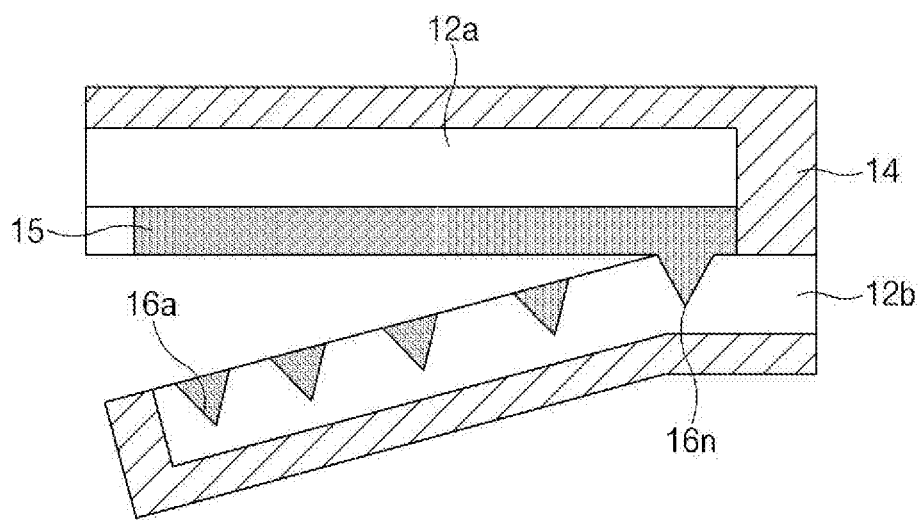
FIG. 9 is an enlarged view illustrating a state in which the second electrode lead is detached up to a portion on which an n-th notch is provided in FIG. 6 according to an embodiment of the present invention.

FIG. 9 is an enlarged view illustrating a state in which the second electrode lead 12b is detached up to a portion on which an n-th notch 16 is provided in FIG. 6 according to an embodiment of the present invention.

When n notches 16 are provided, and a gas is continuously generated in the battery case 13 so that the internal pressure increases to an n-th pressure or more, the second electrode lead 12b is detached in n stages up to the portion on which the first notch 16 is disposed. When the second electrode lead 12b is detached in the n stages, it is immediately before the second electrode lead 12b is completely detached from the first electrode lead 12a. Thus, the warning notification device notifies an n-th warning that is the replacement of the secondary battery 1 is necessary to the user.

For example, as illustrated in FIG. 9, when five notches 16 are provided, and thus, the internal pressure of the battery case 13 increases to a fifth pressure or more, the second electrode lead 12b is detached in fifth stages up to the portion on which the fifth notch 16 is disposed. Also, the warning notification device notifies a fifth warning.

The total number of stages in which the second electrode lead 12b is detached is one more than the number of notches 16 provided on the second electrode lead 12b. If the second electrode lead 12b is detached in (n+1)-th stages, the second electrode lead 12b is completely detached from the first electrode lead 12a. Thus, the electricity generated from the electrode assembly 10 is interrupted, and the power is not supplied from the second battery 1 any more. The user may grasp the state of the secondary battery 1 through the n-th warning before the secondary battery 1 is in this state and thus may replace the secondary battery 1 in advance.

The warning notification device may notify the warning in various manners such as sounds, lamps, figures, and the like as long as the warning is notified to the user. For example, if the warning notification device notifies the warning to the user through the lamp, a blue lamp may be turned on as the first warning when the second electrode lead 12b is detached in one stage. Also, the detachment proceeds to second and third stages, green and yellow lamps are turned on to notify second and second warnings. Also, when the detachment proceeds in an n stage, a red lamp may be turned on to notify a final warning of an n-th order to the user. That is, if the current state of the secondary battery 1 is notified to the user, and thus, the user is capable of easily grasping the replacement time of the secondary battery, the warning notification device may notify the warning in various manners.

Those with ordinary skill in the technical field of the present invention pertains will be understood that the present invention can be carried out in other specific forms without changing the technical idea or essential features. Therefore, the above-disclosed embodiments are to be considered illustrative and not restrictive. Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A pouch type secondary battery, comprising:
   an electrode assembly having a positive electrode, and a negative electrode, and a separator laminated therein;
   a battery case having a pouch shape to accommodate the electrode assembly;
   an electrode tab connected to the electrode assembly and protruding from one side of the electrode;
   a first electrode lead having one end connected to the electrode tab;
   a second electrode lead having one end connected to the other end of the first electrode lead and the other end protruding to an outside of the battery case;
   a connection part bonding the first electrode lead to the second electrode lead to connect the first and second electrode leads to each other,
      wherein, in at least one of the first and second electrode leads, a plurality of notches are provided on a bonding surface of one of the first electrode lead and the second electrode lead to which the other one of the first electrode lead and the second electrode lead are bonded through the connection part, and
      wherein the plurality of notches are arranged in a line at predetermined intervals in a direction from one end to the other end of the first or second electrode lead; and
   a warning notification device programmed to provide a warning to a user of a degree of detachment of the first and second electrode leads based on the number of notches detached when the first and second electrode leads become detached from each other.

2. The pouch type secondary battery of claim 1, wherein each of the predetermined intervals between the plurality of notches is the same.

3. The pouch type secondary battery of claim 1, wherein each of the predetermined intervals between adjacent ones of the plurality of notches is different.

4. The pouch type secondary battery of claim 3, wherein each of the predetermined intervals between adjacent ones of the plurality of notches increases in length from one to the other end of the first or second electrode lead.

5. The pouch type secondary battery of claim 1, wherein the warning notification device is configured to measure resistance between the first and second electrode leads to determine whether the first and second electrode leads are detached from each other or the amount of detachment.

6. The pouch type secondary battery of claim 1, wherein the warning notification device is configured to provide different warnings to the user according to stages in which the first and second electrode leads are detached from each other.

7. The pouch type secondary battery of claim 1, wherein the notches have a triangular cross-sectional shape in a longitudinal cross-section thereof.

8. The pouch type secondary battery of claim 1, further comprising an insulation part surrounding a portion of each of the first and second electrode leads to bond the first and second electrode leads to the battery case.

9. The pouch type secondary battery of claim 8, wherein a bonding force between each of the first and second electrode leads and the connection part is less than that between each of the first and second electrode leads and the insulation part.

10. The pouch type secondary battery of claim 8, wherein the insulation part surrounds the first and second electrode leads at a portion at which the first and second electrode leads are connected to each other through the connection part.

11. The pouch type secondary battery of claim 8, wherein the insulation part includes at least one of a thermoplastic resin, a thermosetting resin, and a photocurable resin.

12. The pouch type secondary battery of claim 1, wherein the connection part includes an electrically conductive polymer.

13. The pouch type secondary battery of claim 1, wherein the connection part has a thickness of 1 μm to 500 μm.

14. A pouch type secondary battery, comprising:
a battery case having a pouch shape;
a first electrode lead having a first end within the battery case; and
a second electrode lead having:
a first end electrically connected to a second end of the first electrode lead, and
a second end extending outside of the battery case,
wherein a first inclined surface is provided on at least one of the second end of the first electrode lead and the first end of the second electrode lead,
wherein at least one of the first and second electrode leads includes a plurality of notches on a surface thereof at which the first and second electrode leads are electrically connected to each other such that the first and second electrode leads are configured to detach from each other in stages corresponding to the plurality of notches with expansion of the battery case; and
a warning notification device programmed to provide a notification of a degree of detachment according to the stages based on a measured resistance between the first and second electrode leads.

15. The pouch type secondary battery of claim 14, wherein the battery case includes an insulating layer configured to seal the battery case around the first and second electrode leads.

16. The pouch type secondary battery of claim 14, wherein a bonding force between the first electrode lead and the insulating layer and a bonding force between the second electrode lead and the insulating layer are each stronger than a bonding force of the electrical connection between the first and second electrode leads.

* * * * *